United States Patent
Heo et al.

(10) Patent No.: US 11,625,385 B2
(45) Date of Patent: Apr. 11, 2023

(54) METHOD AND APPARATUS FOR MANAGING DATA BASED ON BLOCKCHAIN

(71) Applicant: SAMSUNG SDS CO., LTD., Seoul (KR)

(72) Inventors: Young Yoo Heo, Seoul (KR); Kwang Cheol Lee, Seoul (KR); Sang Ji Bae, Seoul (KR); Jun Tae Kim, Seoul (KR); Jung Eun Lee, Seoul (KR); Kyu Sang Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 10 days.

(21) Appl. No.: 16/885,650

(22) Filed: May 28, 2020

(65) Prior Publication Data

US 2021/0365433 A1 Nov. 25, 2021

(30) Foreign Application Priority Data

May 19, 2020 (KR) .......................... 10-2020-0059452

(51) Int. Cl.
*G06F 16/23* (2019.01)
(52) U.S. Cl.
CPC ...... *G06F 16/2365* (2019.01); *G06F 16/2315* (2019.01)

(58) Field of Classification Search
CPC .......................... G06F 16/2365; G06F 16/2315
See application file for complete search history.

(56) References Cited

U.S. PATENT DOCUMENTS

| | | | |
|---|---|---|---|
| 2017/0323392 A1* | 11/2017 | Kasper | .................. H04L 63/123 |
| 2018/0152289 A1* | 5/2018 | Hunt et al. | |
| 2019/0013933 A1* | 1/2019 | Mercuri | ................. G06F 16/904 |
| 2019/0340267 A1* | 11/2019 | Vo | ........................ G06F 16/2365 |
| 2019/0342084 A1* | 11/2019 | Mehedy et al. | |
| 2020/0304326 A1* | 9/2020 | Xie | ..................... H04L 63/1416 |

FOREIGN PATENT DOCUMENTS

KR 10-2019-0076197 A 7/2019

* cited by examiner

*Primary Examiner* — Ashish Thomas
*Assistant Examiner* — Dustin D Eyers
(74) *Attorney, Agent, or Firm* — The PL Law Group, PLLC

(57) ABSTRACT

A blockchain based data management method performed by a computing device according to an embodiment of the present disclosure includes recording a deletion event for off-chain data and time information of the deletion event in a blockchain network, and selectively deleting the off-chain data based on a validity verification result calculated for the time information, wherein the validity verification result is calculated using a time-consensus algorithm of the blockchain network.

13 Claims, 13 Drawing Sheets

METHOD AND APPARATUS FOR MANAGING DATA BASED ON BLOCKCHAIN

CROSS REFERENCE TO RELATED APPLICATIONS AND CLAIM OF PRIORITY

This application claims the benefit of Korean Patent Application No. 10-2020-0059452 filed on May 19, 2020 in the Korean Intellectual Property Office, the disclosure of which is incorporated herein by reference in its entirety.

FIELD

The present disclosure relates to a method and apparatus for managing data based on a blockchain. More specifically, it relates to a method and apparatus for reliably managing off-chain data that is not stored on the blockchain using blockchain technology.

DESCRIPTION OF THE RELATED ART

Blockchain is a data management technology, in which continuously increasing data are recorded in blocks of a specific unit and each blockchain node constituting a peer-to-peer network manages blocks as a data structure in the form of a chain. Blockchain can ensure the integrity and security of transactions through a consensus process, in which all blockchain nodes belonging to the network verify and record all transactions.

Data recorded in the blockchain is referred to as on-chain data, and data managed based on the blockchain technology but not recorded in the blockchain is referred to as off-chain data. Since the size of each block constituting the blockchain is limited and the blockchain itself is an expensive resource, not all data that should be reliably managed can be recorded in the blockchain. Since this off-chain data is stored outside the blockchain, it is vulnerable to unauthorized manipulation, etc. Therefore, it is required to provide a blockchain-based data management method that can reliably manage off-chain data.

On the other hand, in a consortium blockchain composed by two or more organizations, on-chain data as well as off-chain data are shared between all organizations constituting the consortium blockchain. In this case, the organization that shared the data needs to perform post-management on the shared data. For example, when data is shared under certain conditions, it is preferable to withdraw or discard the data that was shared after such conditions is resolved. For this reason, it is required to provide a blockchain-based data management method that can continuously manage off-chain data after being shared.

SUMMARY

The technical problem to be achieved through some embodiments of the present disclosure is to provide a blockchain based data management method and apparatus capable of transparently managing the history of off-chain data on a blockchain basis by managing the lifecycle of off-chain data through on-chain data.

Another technical problem to be achieved through some embodiments of the present disclosure is to provide a blockchain-based data management method and apparatus that can overcome the limitations of the existing blockchain technology, which was difficult to process large amounts of data, by managing the data based on the blockchain event, but sharing the actual data through an off-chain network.

Another technical problem to be achieved through some embodiments of the present disclosure is to provide a blockchain-based data management method and apparatus capable of post-management of off-chain data shared outside by implementing deletion verification, and automatic discard function for off-chain data.

The technical problems of the present disclosure are not limited to the technical problems mentioned above, and other technical problems not mentioned will be clearly understood by those skilled in the art from the description below.

According to an embodiment of the present disclosure, a blockchain based data management method performed by a computing device comprises recording a deletion event for off-chain data and time information of the deletion event in a blockchain network, and selectively deleting the off-chain data based on a validity verification result calculated for the time information, wherein the validity verification result is calculated using a time-consensus algorithm of the blockchain network.

According to another embodiment of the present disclosure, a blockchain based data management method performed by a computing device comprises requesting a first blockchain node to delete off-chain data, checking, via a blockchain network, a result of the first blockchain node deleting the off-chain data from a first off-chain storage according to the deletion request, and requesting the first blockchain node to verify the deletion result, wherein the first blockchain node records storage space information of the first off-chain storage in the blockchain network in response to the verification request, wherein the storage space information is verified for validity by a chain code of the blockchain network.

According to another embodiment of the present disclosure, a blockchain based data management apparatus comprises a processor, a memory for loading a computer program executed by the processor, and a storage for storing the computer program, wherein the computer program comprises instructions for executing operations comprising, recording a deletion event for off-chain data and time information of the deletion event in a blockchain network, and selectively deleting the off-chain data based on a validity verification result calculated for the time information, wherein the validity verification result is calculated using a time-consensus algorithm of the blockchain network.

DETAILED DESCRIPTION

Figure 1:
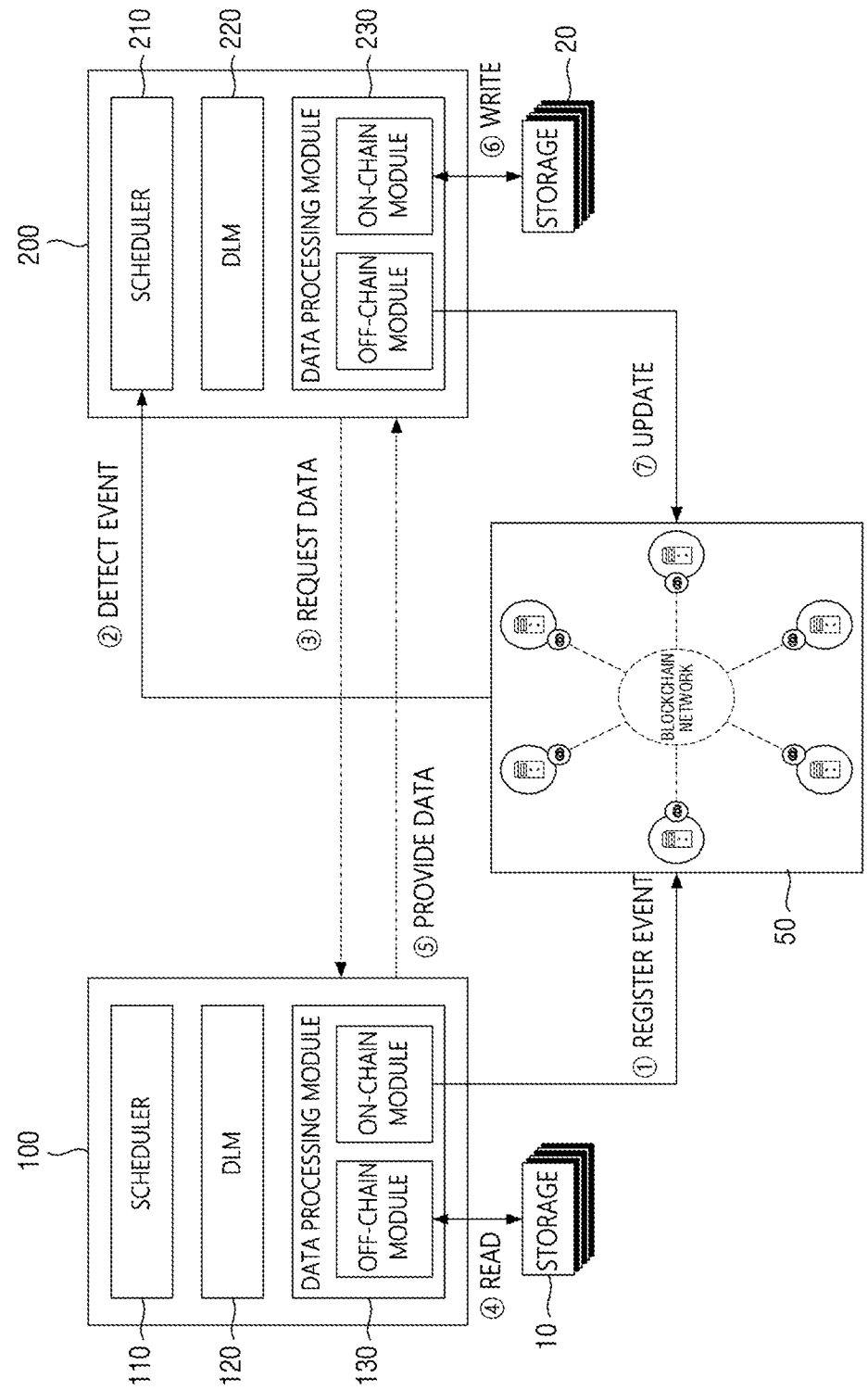
FIG. 1 is a block diagram showing a blockchain-based data management device 100 according to an embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present invention, when it is determined that the detailed description of the related well-known configuration or function may obscure the gist of the present invention, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the invention. In this specification, the singular also includes the plural unless specifically stated otherwise in the phrase.

In addition, in describing the component of this invention, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, some embodiments of the present invention will be described in detail with reference to the accompanying drawings.

FIG. 1 is a block diagram showing a blockchain-based data management device 100 according to an embodiment of the present disclosure.

As shown in FIG. 1, the blockchain-based data management device (hereinafter referred to as "data management device") according to the present embodiment manages the lifecycle of off-chain data (creation, sharing, change, deletion, discard, etc.) through an on-chain event of the blockchain network 50, and records the management history of off-chain data as on-chain data. The data management device 100 may be a blockchain node constituting the blockchain network 50 or a system including the blockchain node.

The blockchain node mentioned herein refers to a computing device that configures a blockchain network 50 of a peer-to-peer (P2P) structure and operates according to a blockchain protocol. Each blockchain node can manage the ledger of the blockchain network 50, and the transaction data and status record of the blockchain network 50 can be recorded in the ledger. The blockchain node can execute various chain codes (or smart contracts) through the blockchain network 50, and ensures integrity and security of transactions executed through the blockchain network 50 as a member constituting the consensus process of the blockchain network 50.

In some embodiments, the data management device 100 is connected to one or more off-chain storage 10. The off-chain storage 10 may be an internal component included in the data management device 100, or may be a separate device that is separate from the data management device 100 as shown in FIG. 1. The off-chain storage 10 is independent storage that is distinguished from the distributed ledger of the blockchain network 50, and data stored in the off-chain storage 10 is referred to as off-chain data to distinguish it from on-chain data recorded in the distributed ledger.

The data management device 100 includes a scheduler 110 for scheduling management tasks (e.g., data sharing, data deletion, data discard, etc.) of off-chain data, and a DLM 120 (Data Lifecycle Manager) for receiving a task from the scheduler 110 and executing it, and data processing module 130 for reading and writing on-chain data and off-chain data.

For a detailed understanding of the operating method of the data management device 100, a method of sharing off-chain data with other data management devices 200 will be described as an example. Here, another data management device 200 is also a device that manages the lifecycle of off-chain data, and may be a blockchain node constituting the blockchain network 50 or a system including the blockchain node.

First, it is assumed that the data management device 100 received a request to share off-chain data to another data management device 200 from a client device (not shown). According to the request, the scheduler 110 schedules a task for sharing off-chain data, and assigns it to the DLM 120 when the sharing task is executed. The DLM 120 registers an on-chain event for data sharing in the blockchain network 50 through the data processing module 130.

The other data management device 200 detects the registered on-chain event, and accordingly requests the data management device 100 to share data. The data management device 100 checks whether the other data management device 200 has permission to receive shared data through an on-chain event that was previously registered, and if it is determined that it has permission, reads data from the off-chain storage 10 and transmits it to the other data management device 200. At this time, the transmitted data is transmitted through the off-chain network. The other data management device 200 stores the received data in its off-chain storage 20 and updates the shared history to the blockchain network 50. At this time, the other data management device 200 may verify consistency on whether the received data has abnormality by using a hash recorded in the blockchain network 50.

According to this embodiment, data is managed in a dual way, in which actual processing such as storage and transmission of data is performed on off-chain, and lifecycle management and history management of data is performed on on-chain. According to this, it is possible to transparently manage the history of data based on the blockchain, and has the advantage of overcoming the limitations of the existing blockchain technology, which was difficult to process large amounts of data.

Hereinafter, various embodiments of the present disclosure will be described in more detail with reference to the drawings.

Figure 2:
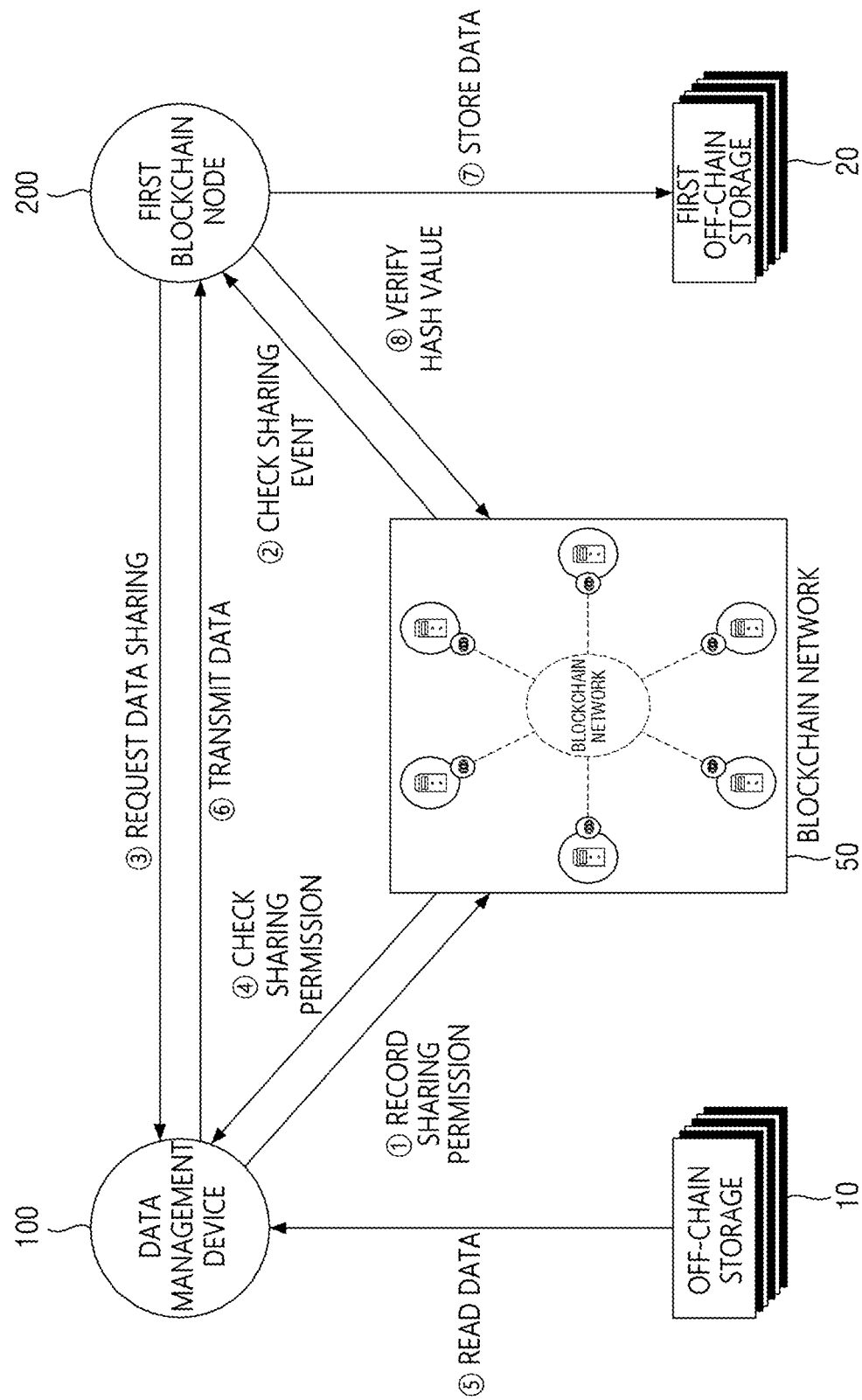
FIG. 2 is a diagram describing a method for sharing off-chain data with other blockchain nodes, as an example of explaining a blockchain-based data management method according to the present disclosure.

FIG. 2 is a diagram describing a method for sharing off-chain data with other blockchain nodes, as an example for explaining a blockchain-based data management method according to the present disclosure. In the embodiment of FIG. 2, it is assumed that the data management device 100 is a blockchain node constituting the blockchain network 50.

The data management device 100 registers a first block event for sharing off-chain data in the blockchain network 50. At this time, the sharing permission for off-chain data may be recorded together as on-chain data.

The first blockchain node 200 is a device that receives off-chain data from the data management device 100. The first blockchain node 200 may be the other data management device 200 described in FIG. 1. The first blockchain node 200 detects the first block event on the on-chain, and confirms that it is an event sharing off-chain data with itself. Then, in response to confirming the sharing event, the first blockchain node 200 requests the sharing of off-chain data to the data management device 100. At this time, the first blockchain node 200 may selectively request sharing of the off-chain data according to the system state. For example, when the first blockchain node 200 is set to automatically receive the shared data, the first blockchain node 200 automatically requests sharing of off-chain data after confirming the sharing event. On the other hand, if the first blockchain node 200 is set to receive the shared data manually, the first blockchain node 200 does not immediately request sharing of off-chain data even if the sharing event is confirmed, but waits for the user's operation for the request to share, and then requests to share of the off-chain data. Alternatively, even if the first off-chain storage 20 does not have enough space to receive the shared data, it may wait for the necessary storage space to be secured, and then request sharing of the off-chain data.

The data management device 100 receives a sharing request from the first blockchain node 200, and checks whether the first blockchain node 200 has a sharing permission for off-chain data through on-chain data. In this case, the on-chain data may be data that was recorded together with the sharing permission when the data management device 100 previously registered the first block event. When it is confirmed that the first blockchain node 200 has the sharing permission of off-chain data, the data management device 100 reads off-chain data from the off-chain storage 10 and transmits it to the first blockchain node 200 through the off-chain network. Here, the off-chain network refers to a wired/wireless network excluding the blockchain network 50, and data transmission through the off-chain network is much more economical in terms of cost and time than through the blockchain network 50. When the amount of data to be transmitted is large, there is a problem in that it is difficult to process it with the blockchain network 50, so an off-chain network is used in actual data transmission.

The first blockchain network 200 receives the transmitted off-chain data and stores it in its first off-chain storage 20. As one embodiment, the first blockchain network 200 may find the hash value of the off-chain data received from the blockchain network 50, extract the hash value from its received off-chain data, and compare them to verify the integrity of the received off-chain data. At this time, if the two hash values coincide with each other, since the integrity of the off-chain data received by the first blockchain network 200 is verified, this completes the data sharing procedure and the first blockchain node 200 can update the history information indicating that data has been successfully shared to the blockchain network 50. On the other hand, if the two hash values do not coincide with each other, since the off-chain data received by the first blockchain network 200 may be forged or falsified, the first blockchain network 200 may notify the data management device 100 that the received data is not normal data and request retransmission of off-chain data.

Meanwhile, as an embodiment, the data management device 100 may complete the sharing of off-chain data, and then generate a one-time encryption key and record it in the blockchain network 50. The one-time encryption key is, for example, an asymmetric encryption key consisting of a pair of public keys and private keys, and the data management device 100 records the public key among them in the blockchain network 50. As will be described later, the encryption key is used to verify whether the shared off-chain data has been deleted.

Figure 3:
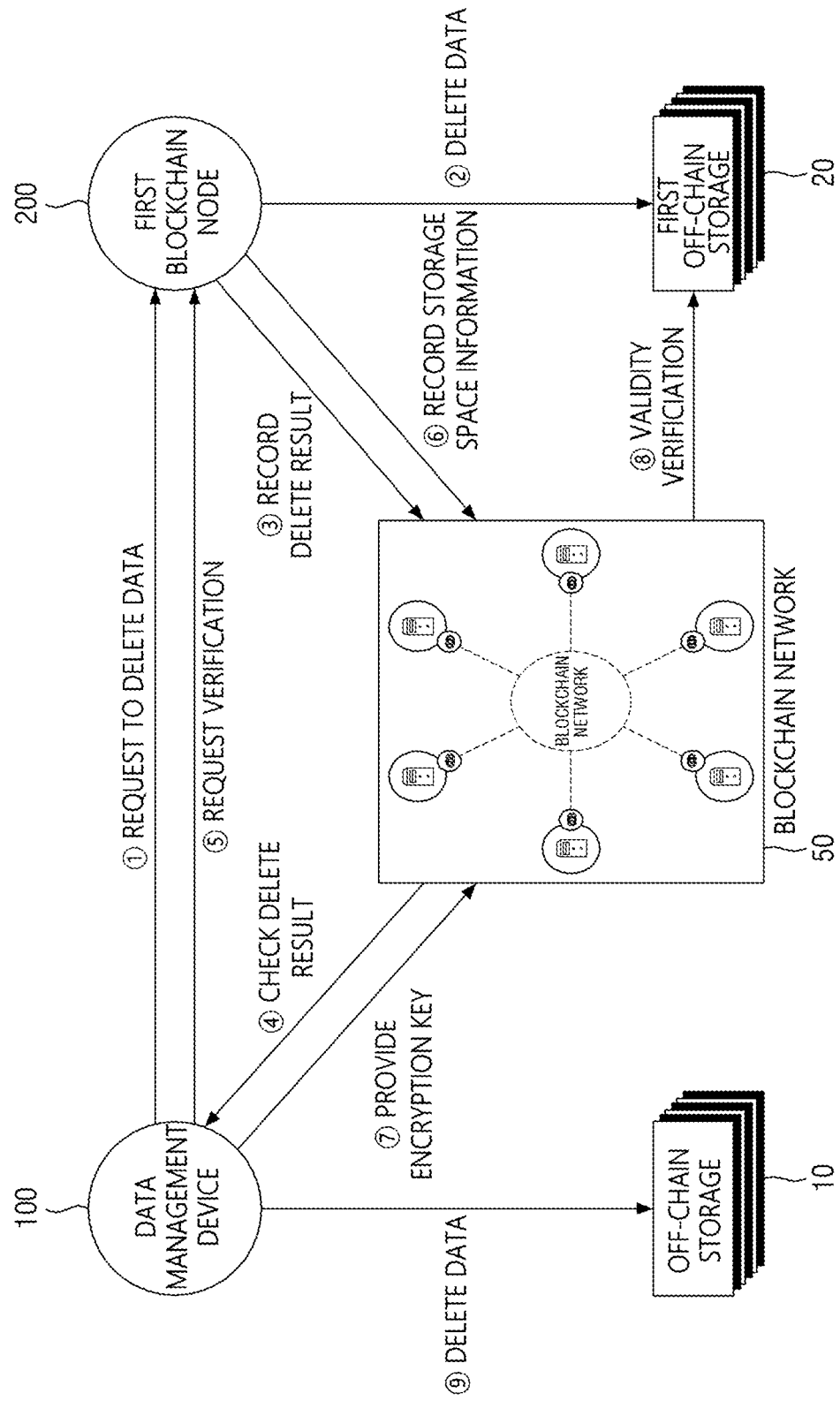
FIGS. 3 to 5 are diagrams illustrating a method of deleting off-chain data shared with other blockchain nodes, as another example for explaining a blockchain-based data management method according to the present disclosure.
Figure 4:
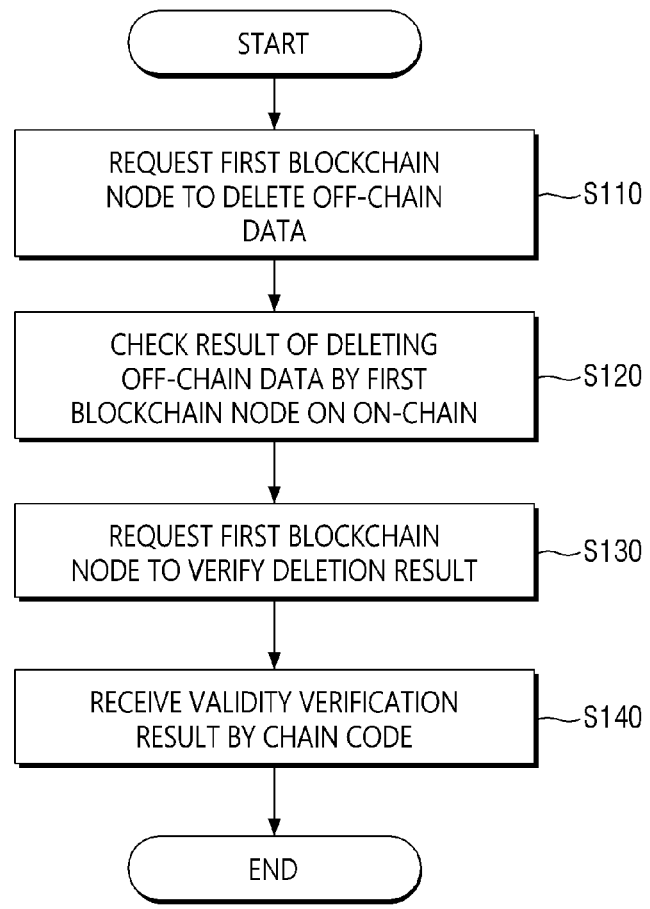
Figure 5:
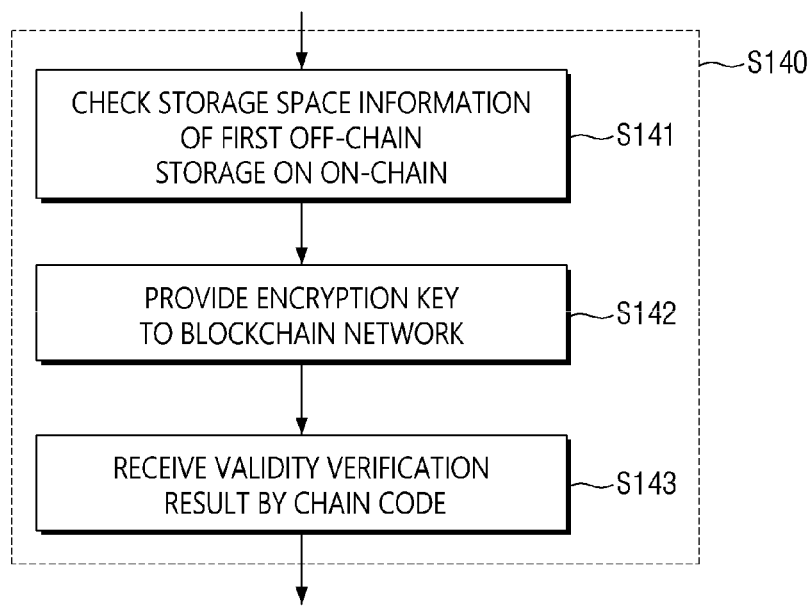

FIGS. 3 to 5 are diagrams illustrating a method of deleting off-chain data shared with other blockchain nodes, as other examples for describing a blockchain-based data management method according to the present disclosure. In the embodiment of FIG. 3, an embodiment of requesting deletion of off-chain data owned by another blockchain node and verifying that data deletion is successfully completed is described. In the past, even if a request was made to delete the shared data, there was no way to verify that the data was actually deleted, so there was a problem in that reliable post-management of the shared data is difficult. The embodiment suggests a solution for this. Hereinafter, it will be described with reference to the drawings.

The data management device 100 requests the first blockchain node 200 to delete the off-chain data. At this time, the off-chain data requested to be deleted may be off-chain data previously shared by the data management device 100 to the first blockchain node 200.

In response to the deletion request, the first blockchain node 200 deletes the data requested to be deleted from its off-chain storage 20 and records the deletion result indicating that the deletion is completed in the blockchain network 50 through the second block event.

The data management device 100 detects the second block event on the on-chain, and checks the deletion result recorded by the first blockchain node 200 therefrom. And, the data management device 100 requests deletion verification to the first blockchain node 200 in order to confirm whether the deletion has actually been performed well. As one embodiment, the data management device 100 may transmit a random data ID together with the deletion verification request, so that whether verification information for the first off-chain storage provided by the first blockchain node 200 is actually for the first off-chain storage can be proved. Since the description of the random data ID will be described later in more detail, a description thereof will be omitted here.

The first blockchain node 200 creates storage space information of the first off-chain storage 20, in which the deleted data is stored, and then records it in the blockchain network 50 through a third block event. The storage space information is information that can access the storage area of the first off-chain storage 20, and may be hashed so that other information recorded in the first off-chain storage 20 is not exposed. The storage space information may include one-time account information (e.g., ID and password) that can access the first off-chain storage 20 and hash salt.

Further, the storage space information may be encrypted with the public key of the data management device 100 so that only the data management device 100 can check it. At this time, the public key may be a public key recorded in the blockchain network 60 after the data management device 100 completes sharing of the off-chain data to the first blockchain node 200.

When the first blockchain node 200 registers the third block event on the on-chain, the data management device 100 detects this and provides its private key to enables the chain code to decrypt the encrypted storage space information. The chain code is a software algorithm that runs on the blockchain network 50, and verifies the validity of storage space information submitted by the first blockchain node 200, that is, whether data is actually deleted from the first off-chain storage 20. The private key is an encryption key paired with the public key, and may be a decryption key capable of decrypting the encrypted storage space information.

When the private key is provided to the blockchain network 50, the chain code decrypts the storage space information using the private key, obtains one-time account information from the decrypted information, accesses the first off-chain storage 20, and obtains information about the storage area of the first off-chain storage 20. At this time, the chain code may obtain the one-time account information by parsing the decrypted information in a hashed state using an encryption technology.

As an embodiment, the chain code may verify whether the first off-chain storage 20 is the storage accessed by itself using the random data ID previously transmitted by the data management device 100 (storage verification). The random data ID above is randomly extracted from the on-chain data registered by the first blockchain node 200 for the first off-chain storage 20, and the chain code obtains the hash value of the data area corresponding to the random data ID (hereinafter, referred to as a random data ID area), and then compares it with the hash value of the random data ID area registered on the on-chain to verify whether a storage accessed by itself is the first off-chain storage 20.

Then, the chain code accesses the first off-chain storage 20 and checks whether the data requested to be deleted has actually been deleted (deletion verification). As an embodiment, the chain code may refer to a data ID of data requested to be deleted (hereinafter, referred to as a first data ID), and search for an area corresponding thereto to check whether data has actually been deleted. At this time, similarly to the case of storage verification, the chain code may obtain the hash value of the data area corresponding to the first data ID (hereinafter, referred to as the first data ID area) and compare it with the hash value of the first data ID area registered on the on-chain to verify whether the data requested to be deleted has actually been deleted. As an embodiment, the first data ID may be transmitted together with the random data ID or as part of the random data ID when the data management device 100 transmits the random data ID.

When the storage verification and deletion verification are successfully completed, the chain code regards that the validity verification of the storage space information is ended, and deletes the one-time information used for the validity verification, for example, one-time account information or private key information. Then, a fourth block event indicating that the validity verification of the storage space information is successfully completed is registered in the blockchain network 50.

Finally, the present embodiment ends with the data management device 100 detecting the fourth block event on the on-chain and confirming that the deletion request is successfully verified.

FIG. 4 is a flowchart for describing in further detail the embodiment of FIG. 3 from the perspective of the data management device 100. Accordingly, in the embodiment of FIG. 4, when a subject of each step is not specified, it is assumed that the subject is the data management device 100.

In step S110, the data management device 100 requests the first blockchain node 200 to delete the off-chain data. The off-chain data requested to be deleted is data previously shared by the data management device 100 to the first blockchain node 200, and may be data, of which a master owner is the data management device 100. Here, the meaning of the master owner is an owner having the highest permission for the data, and may mean an original creator, an initial distributor, or a top-level administrator of the data.

The first blockchain node 200 deletes the data requested to be deleted from the first off-chain storage 20 in response to the data deletion request, and generates a block event recording the result.

In step S120, the data management device 100 detects a block event and checks the deletion result recorded by the first blockchain node 200 on the on-chain.

In step S130, the data management device 100 requests verification of the deletion result to the first blockchain node 200 whether the data requested to be deleted has actually been deleted. At this time, the data management device 100 may extract at least one random data ID from the on-chain data registered on the on-chain by the first blockchain node 200 and transmit it to the first blockchain node 200 for the storage verification of the first off-chain storage 20.

The first blockchain node 200 creates storage space information from the first off-chain storage 20 in response to the deletion verification request, and records it on the on-chain through a block event. At this time, the storage space information may be encrypted using a public key recorded on the on-chain by the data management device 100.

In step S140, the data management device 100 detects a block event, provides a private key to decrypt the storage space information to the chain code, and receives a validity verification result by the chain code. This will be described in detail with reference to FIG. 5.

Referring to FIG. 5, in step S141, the data management device 100 detects a block event of the first blockchain node 200 on the on-chain and checks the storage space information of the first off-chain storage 20.

In step S142, the data management device 100 provides an encryption key for decrypting the storage space information, that is, its private key to the blockchain network 50. Subsequently, the chain code decrypts the storage space information using the provided encryption key, and performs storage verification and deletion verification for the first off-chain storage 20 according to the method described in FIG. 4. Then, when the storage verification and deletion verification are successfully completed, the chain code deletes the used one-time information, and then registers a block event in the blockchain network 50 indicating that the validity verification of the storage space information is successfully completed.

In step S143, the data management device 100 detects the block event, and receives a validity verification result performed by the chain code.

Figure 6:
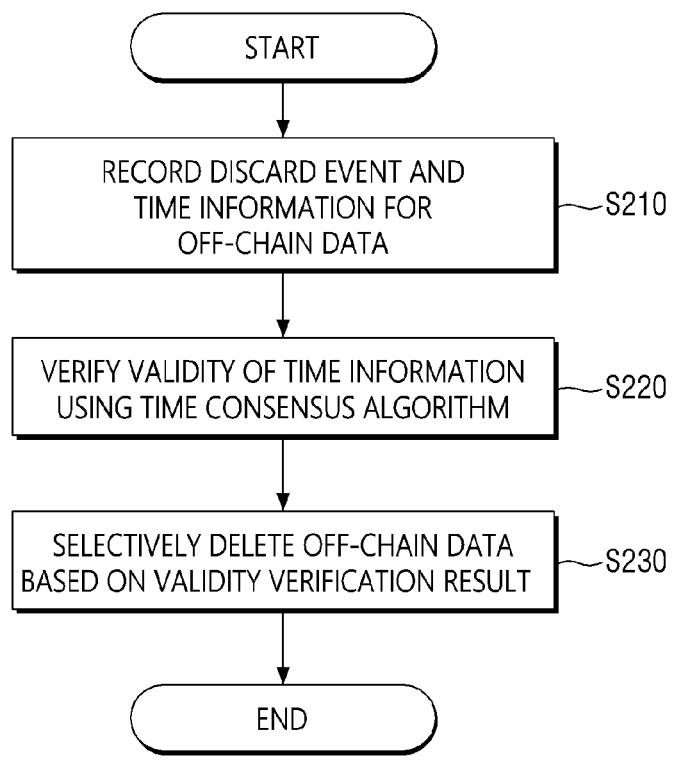
FIG. 6 is a flowchart illustrating a method of discarding off-chain data, of which validity period has expired, as another example for explaining a blockchain-based data management method according to the present disclosure.

FIG. 6 is a flowchart illustrating a method of discarding off-chain data, of which validity period has expired, as another example for describing a blockchain-based data management method according to the present disclosure.

The discarding data described in this embodiment is to delete off-chain data, of which validity period (or storage period) has expired. Since it determines whether to delete off-chain data based on the current time, it is important to verify whether a referenced time is a true time, or a forged/falsified time. For example, if individual blockchain nodes use the manipulated time, the validity period of the data has expired in time of the reality, but the validity period is not yet expired based on the manipulated time, so the case that data to be discarded is not discarded and continues to store may occur.

On the other hand, discarding data is also an act of deleting data from the storage, and thus, largely falls into the category of data deletion, and thus, "deletion" can be used interchangeably with the term "discard."

Such time manipulation may occur in various paths, for example, a user of a blockchain node artificially manipulates the time, so that the scheduler 110 (see FIG. 1) uses the manipulated time when assigning a task, or DLM 120 (see FIG. 1) may use the manipulated time when generating a block event. Alternatively, even if the user of the blockchain node does not intend to manipulate the time, in a case, where a time sharing system (for example, NTP or NSS) referenced by the scheduler 110 when checking the current time is subjected to a hacking attack and provides incorrect time information, time manipulation may occur.

In the present embodiment, it is intended to verify whether or not such time manipulation is performed through a method of verifying whether the time information, which is a basis for determining data discard, is true on the on-chain, and to secure the reliability of data discard. It will be described below with reference to the drawings.

In step S210, the data management device 100 checks whether there is any data, of which validity period (or storage period) has expired, among off-chain data that it stores. When it is confirmed that there is data, of which validity period has expired, the data management device 100 records a discard event in the blockchain network 50 together with the time information in order to proceed with the discard operation for the corresponding off-chain data. This will be described in more detail with reference to FIG. 7.

Figure 7:
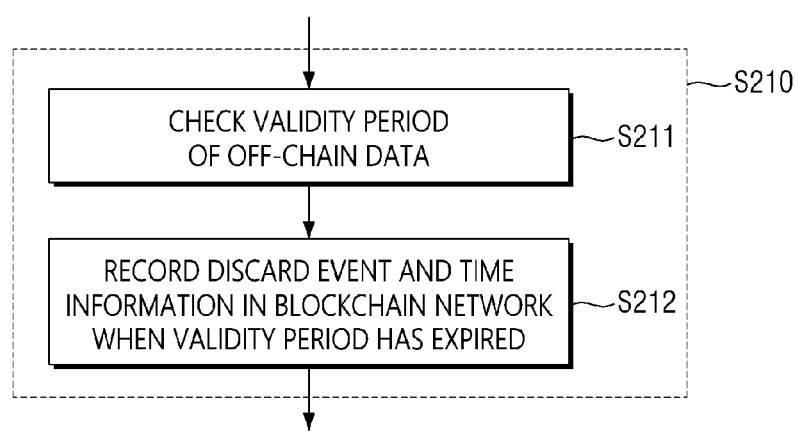
FIG. 7 is a flow chart specifying the step S210 of recording a discard event and time information of FIG. 6 in the blockchain network.

Referring to FIG. 7, in step S211, the data management device 100 checks whether there is any data, of which validity period (or storage period) has expired, among off-chain data that it stores through the scheduler 110 (see FIG. 1). The operation of checking the validity period may be performed by the scheduler 110 periodically (for example, once a day) or aperiodically.

As one embodiment, the scheduler 110 receives the current time information through NTP (Network Time Protocol) or TSS (Time Stamping Server) to synchronize the time of the data management device 100, and compares the synchronized current time and the validity period of the off-chain data to confirm data, of which validity period has elapsed, based on the current time, as data, of which validity period has expired.

In step S212, when the data, of which validity period has expired, is confirmed, the data management device 100 proceeds with discard operation for the corresponding off-chain data through the DLM 120. To this end, the data management device 100 registers a discard event for off-chain data as a block event in the blockchain network 50. At this time, the time information of the discard event is recorded together in the blockchain network 50. The time information may be a timestamp value of the transaction creating the discard event.

Returning back to FIG. 6, in step S220, the validity of the time information of the previously recorded discard event is verified through the chain code of the blockchain network 50. To this end, the chain code uses a time consensus algorithm that verifies the validity of the time information on the on-chain through consensus among a plurality of blockchain nodes belonging to the blockchain network 50, and it is a method, in which each blockchain node determines whether the time information is a valid time using its own time, and a final conclusion is reached on whether the time information is valid by aggregating the results determined by each blockchain node, that is, based on the consensus of the blockchain nodes. The detailed method of the time consensus will be further elaborated in the description of FIGS. 8 to 12.

In step S230, the data management device 100 selectively deletes off-chain data, of which validity period has expired, based on a result of the validity verification previously performed on the on-chain. As a result of validity verification, if the time information is determined to be valid, since it is trustworthy that the validity period of the off-chain data has expired, the data management device 100 deletes the corresponding off-chain data from its off-chain storage 10. Conversely, if it is determined that the time information is not valid as a result of validity verification, since it is not trustworthy that the validity period of the off-chain data has expired, the data management device 100 does not delete the off-chain data and invalidates (or discards) the previously registered discard events and discard operations.

Hereinafter, the embodiment of FIG. 6 will be described taking a specific case as an example.

Figure 8:
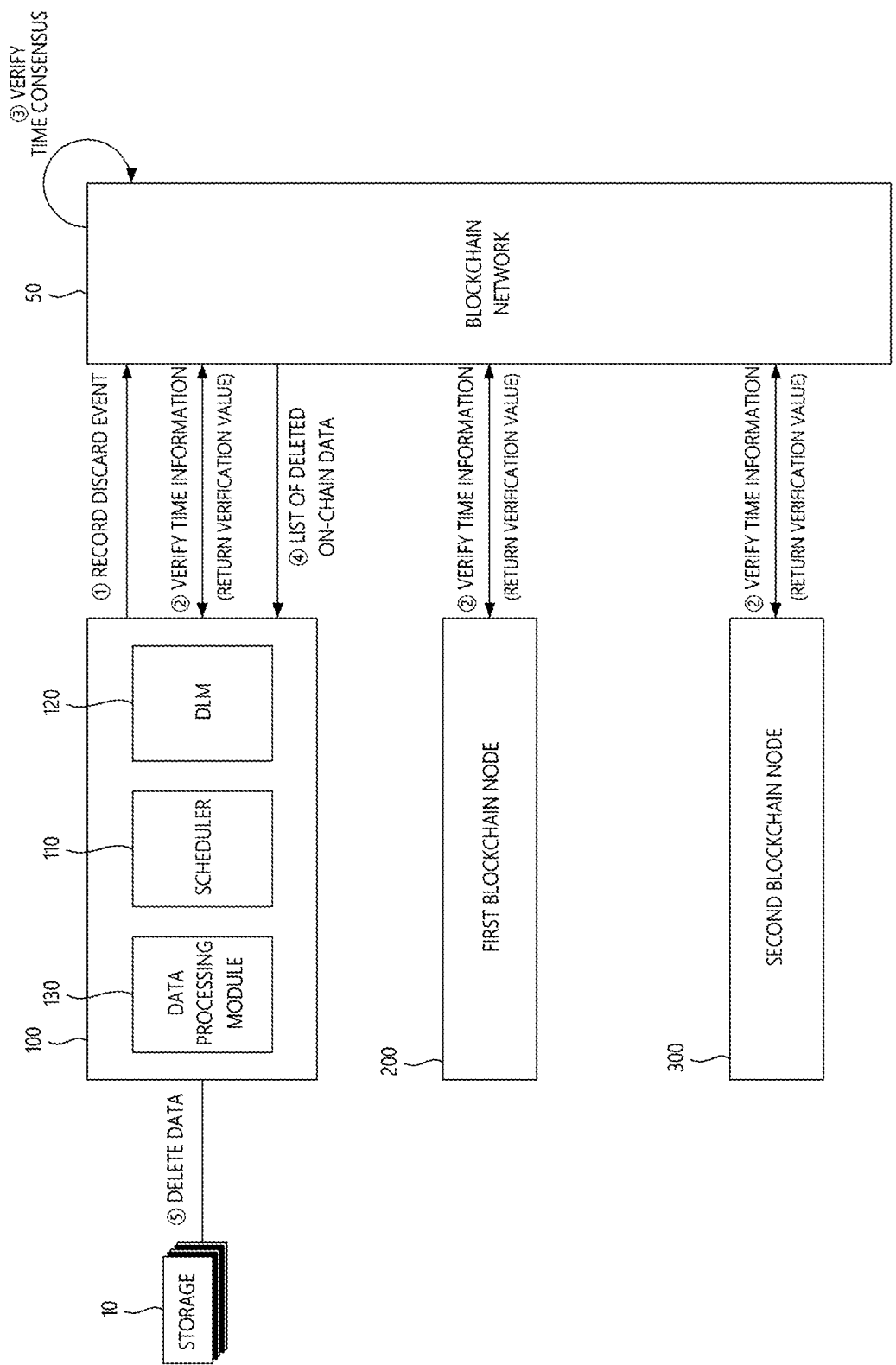
FIG. 8 is a diagram illustrating a method of verifying time information of a discard event based on peer time, as an embodiment of a method of discarding off-chain data.

FIG. 8 is a diagram illustrating a method of verifying time information of a discard event based on peer time, as an embodiment of a method of discarding off-chain data.

First, the data management device 100 checks the off-chain data, of which validity period has expired, through the scheduler 110, and then, if there is any data, of which validity period has expired, assigns a discard task for that to the DLM 120. The DLM 120 records a discard event for discarding off-chain data on the blockchain network 50 according to the assigned discard task. At this time, the time information of the discard event is recorded together, and the time information may be a timestamp value of the transaction generating the discard event.

Next, when a discard event is registered in the blockchain network 50, the chain code of the blockchain network 50 requests verification of the time information to each blockchain node 100, 200, 300. At this time, the data management device 100 may also be requested to verify the time information as a blockchain node.

Each blockchain node 100, 200, 300 verifies the validity of the time information based on its peer time. Here, the peer time is a time set as the current time in individual blockchain nodes 100, 200, 300, and the peer time may be different for each individual blockchain node 100, 200, 300. A detailed method of verifying the validity of time information by each blockchain node 100, 200, and 300 will be described with reference to FIG. 9.

Figure 9:
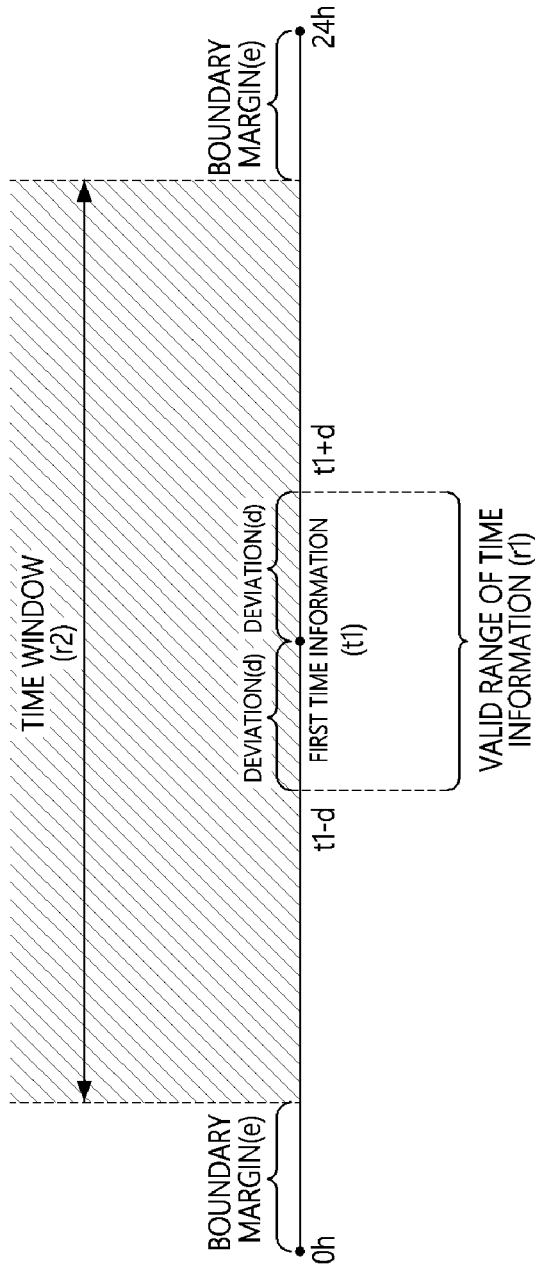
FIG. 9 is a diagram for describing in detail the time information verification method mentioned in FIG. 8.

FIG. 9 describes a method of determining that the time information is valid when the time information is located in the valid range set by the blockchain node. In FIG. 9, for convenience of description, a case, in which the first blockchain node 200 verifies the validity of the time information, is illustrated.

The first blockchain node 200 determines whether the time information of the discard event is located within a predetermined deviation (d) based on its first time information (t1). At this time, the first time information (t1) becomes the peer time of the first blockchain node 200. The valid range (r1) of the time information is a point separated by a deviation (d) based on the first time information (t1), and is from t1-$d$ to t1+d here. If the time information of the discard event is located within the valid range (r1), the time information is located within an error range from the first time information (t1) of the first blockchain node 200, so the first blockchain node 200 determines that the time information is valid. Conversely, if the time information of the discard event is not located within the valid range (r1), the time information is out of an error range from the first time information (t1) of the first blockchain node 200, so the first blockchain node 200 determines that the time information is not valid.

As an embodiment, the first blockchain node 200 may determine that the time information is valid only when the time information is located within a predetermined time window (r2). This is to prevent the boundary effect, in which the determination result is distorted near the edge of a specific period. When the validity of time information is determined without considering the time window (r2), at the edge of the time period (0 h to 24 h), even if the time information has a different date from the first time information (t1), an error that the time information is determined to be valid may occur. Although the time on the on-chain data may be slightly different for each blockchain node, it is preferable to synchronize at least the date to be same to each other, and thus a predetermined boundary margin (e) is set from the boundary time (0 h or 24 h) so that the time information of a different date than the first time information (t1) is not determined to be valid, and it can be determined that it is valid only when the time information is located in the time window (r2) therein. At this time, the boundary margin (e) is set to be greater than or equal to the deviation (d) to avoid an edge effect, that is, an error that is determined to be valid even when the dates are different.

According to this method, the first blockchain node 200 determines that the time information is valid if it is within the error range based on its peer time, and determines that the time information is not valid if it is outside the error range. And, even if the time information is within the above error range, it is determined that the time information is not valid if it is outside the time window (r2).

On the other hand, the embodiment, in which the first blockchain node 200 verifies the validity, is described here, but other blockchain nodes 100 and 300 can also verify the validity of the time information in the same way.

Returning back to FIG. 8, each blockchain node 100, 200, 300 returns the result of verifying the validity of the time information (verification value) to the blockchain network 50 or chain code.

The chain code collects the verification values returned by each blockchain node 100, 200, 300, and determines the validity of the time information based on the consensus of all blockchain nodes. At this time, the chain code refers to the endorsement policy for time consensus, and if the consensus of all blockchain nodes satisfies the endorsement policy, it is determined that the time information is valid, otherwise it is determined that the time information is invalid. At this time, the endorsement policy may be, for example, what is determined to be valid from more than half of all blockchain nodes participating in the time consensus, but is not limited thereto. For example, if the criteria are to be strictly applied, the endorsement policy may be what is determined to be valid from 70% or more of all blockchain nodes. Conversely, if the criteria are to be relaxed and applied, the endorsement policy may be what is determined to be valid from 30% or more of blockchain nodes participating in the time consensus.

If it is determined that the time information is valid, the chain code deletes on-chain data of discard target off-chain data designated by the discard event, for example, a data history or list managed on the on-chain. As an embodiment, the chain code may generate a separate block event indicating that the validity verification of time information is successful. However, although referred to herein as deletion of on-chain data, this does not only refer to the deletion of the on-chain data, but comprehensively refer to the case that the corresponding on-chain data is updated to indicate that the off-chain data has been deleted (or discarded).

The data management device 100 deletes off-chain data stored in the off-chain storage 10 based on the validity verification result by the chain code. As an embodiment, the data management device 100 may check on-chain data that was previously deleted by the chain code, that is, information on the history or list of off-chain data managed on the on-chain, and delete the corresponding off-chain data from the off-chain storage 10. Alternatively, the data management device 100 may detect the block event generated by the chain code to confirm that the time information of the discard event is valid, and delete the off-chain data corresponding to the discard event from the off-chain storage 10.

Figure 10:
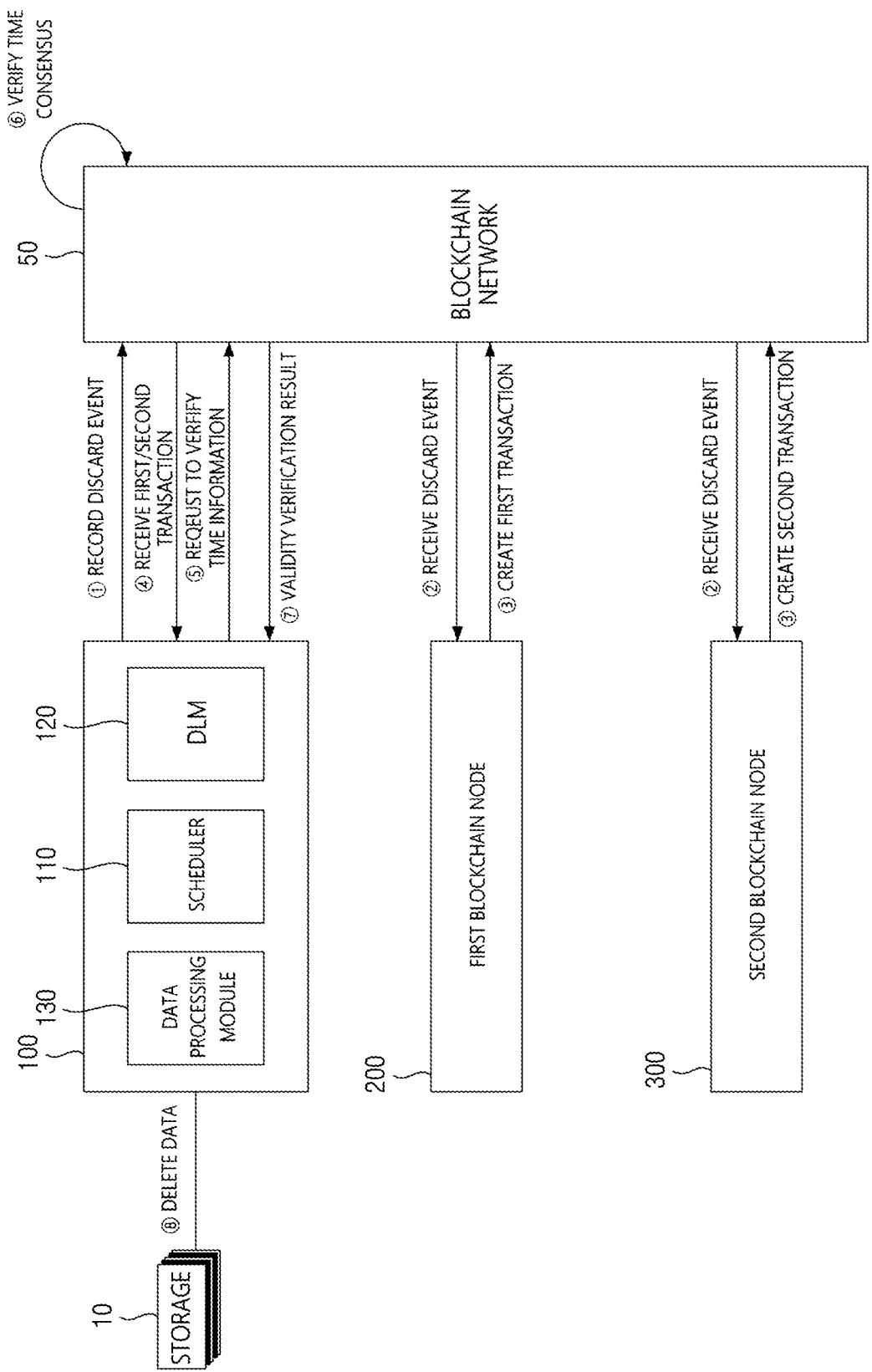
FIG. 10 is a diagram illustrating a method of verifying time information of a discard event based on a block event time of each blockchain node, as another embodiment of a method of discarding off-chain data.

FIG. 10 is a diagram illustrating a method of verifying time information of a discard event based on a block event time of each blockchain node, as another embodiment of a method of discarding off-chain data. The embodiment of FIG. 10 is similar in flow to the embodiment of FIG. 8. However, each of the blockchain nodes 100, 200, 300 verify the reference time using its peer time in the embodiment of FIG. 8, but in the embodiment of FIG. 10, it is different in that the block event time (e.g., timestamp of the transaction) of each of the blockchain nodes 100, 200, 300 is collected and the chain code verifies the validity of the time information based on this. It will be described below with reference to the drawings.

First, the data management device 100 checks the off-chain data, of which validity period has expired, through the scheduler 110, and then, if there is any data, of which validity period has expired, assigns a discard task for that to the DLM 120. The DLM 120 records a discard event for discarding off-chain data according to the assigned discard task on the blockchain network 50. At this time, the time information of the discard event is recorded together, and the time information may be a timestamp value of the transaction generating the discard event.

Next, when a discard event is registered in the blockchain network 50, the remaining blockchain nodes 200 and 300 except for the data management device 100 receive the discard event from the blockchain network 50. And, in response to receiving the discard event, each blockchain node 200, 300 creates its own transaction in the blockchain network 50.

The data management device 100 detects transactions created by other blockchain nodes 200 and 300 and collects key values of the detected transactions. Then, the data management device 100 transmits the collected key values to the blockchain network 50 and requests the validity verification of the time information. As an embodiment, the data management device 100 may wait for a preset number of quorums to request the validity verification. For example, if too few blockchain nodes participate in the time consensus, it may be difficult to sufficiently trust the result of the determination result of the time consensus. Therefore, the data management device 100 continuously collects the key values of the transactions created by other blockchain nodes until the key values above the quorum are collected, and when the key values above the quorum are collected, the data management device 100 may request the validity verification together with the collected key values. As an embodiment, in order to prevent waiting for a long time (Pending) to collect a preset quorum, the data management device 100 may set a timeout time, and if the timeout time is elapsed, it may request the validity verification immediately with the key values collected so far even if the quorum is not reached.

In response to the validity verification request from the data management device 100, the chain code of the blockchain network 50 refers to the collected key values, and collects timestamp values from the transactions (the first and second transactions) generated by each blockchain node 200, 300. The collected timestamp value is used as time information of each blockchain node 200, 300 to verify the validity of the time information. For example, the timestamp value of the first transaction generated by the first blockchain node 200 becomes the first time information, which is an individual time of the first blockchain node 200, and the timestamp value of the second transaction generated by the second blockchain node 300 becomes the second time information, which is an individual time of the second blockchain node 200.

Then, the chain code determines whether the time information is valid for each blockchain node 200, 300 in the manner described in FIG. 9, and filially determines the validity of the time information based on the consensus. For example, when the timestamp of the first transaction is the first time information (t1) of the first blockchain node 200, and if the time information is located in the valid range (r1), it is determined to be valid as described in FIG. 9. Otherwise, it is determined to be not valid. After performing this for all the blockchain nodes that collect the key value, if the consensus aggregating the results satisfies the endorsement policy, it is determined that the time information is valid, otherwise it is determined that the time information is not valid. When it is determined that the time information is valid, the chain code generates a block event indicating that the validity verification of the time information is successful.

The data management device 100 deletes off-chain data stored in the off-chain storage 10 based on the validity verification result by the chain code. Since the specific method of the data management device 100 deleting the off-chain data based on the validity verification result is the same as that described in FIG. 8, additional description thereof will be omitted here.

Figure 11:
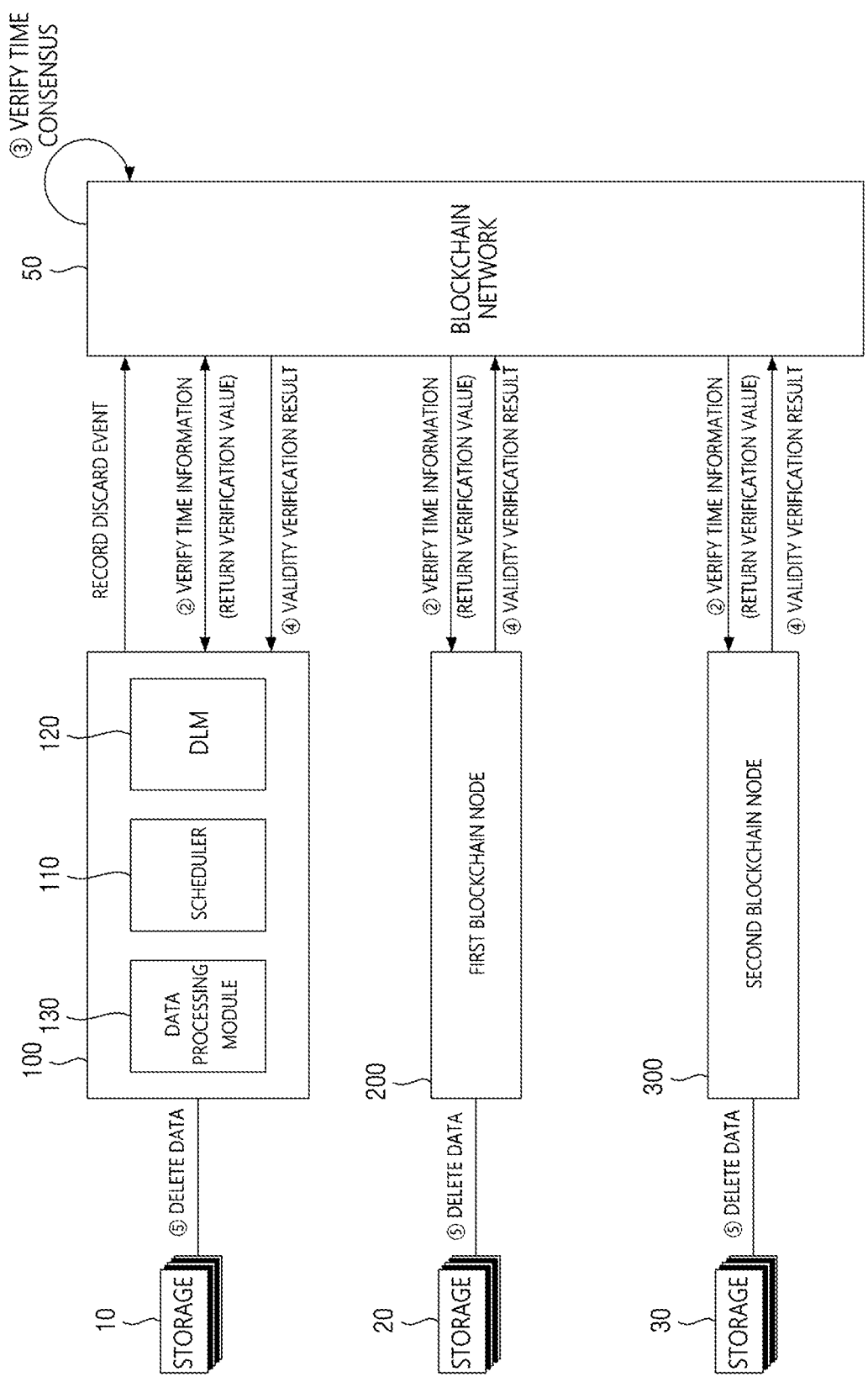
FIG. 11 is a diagram illustrating a method of verifying time information of a discarding event based on peer time, but batching discarding off-chain data for the entire off-chain storage when the time information is valid, as another embodiment of a method of discarding off-chain data.
Figure 12:
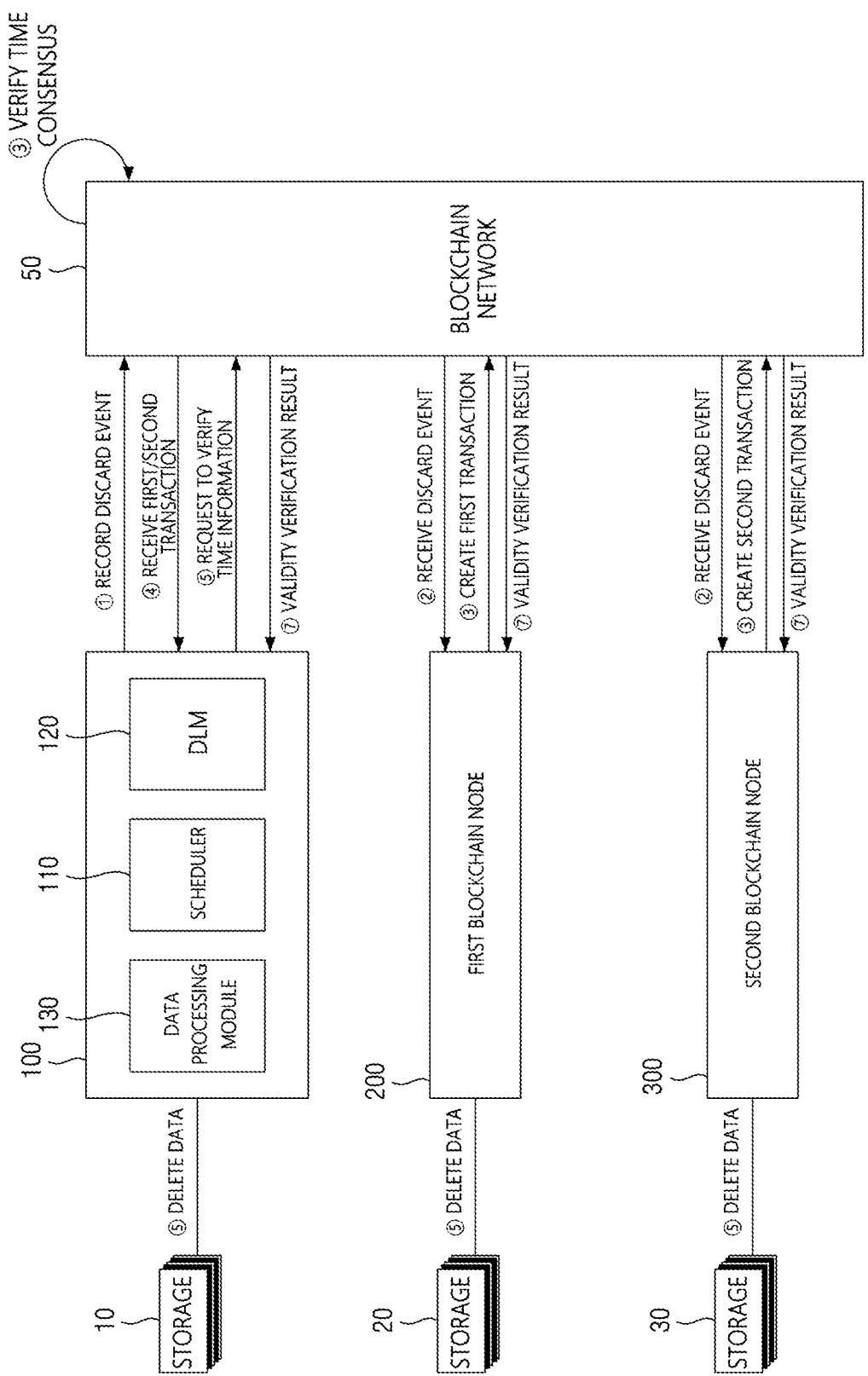
FIG. 12 a diagram illustrating a method of verifying the time information of the discard event based on the block event time of each blockchain node, but batching discarding off-chain data for the entire off-chain storage when the time information is valid, as another embodiment of a method of discarding off-chain data.

FIGS. 11 and 12 describe an embodiment, in which off-chain data is deleted across all blockchain nodes by a discard event. The embodiments of FIGS. 11 and 12 are substantially the same as those of FIGS. 8 and 10, respectively. However, it is different in that the off-chain data deletion according to the discard event is performed by the first and second blockchain nodes 200 and 300 as well as the data management device 100.

The embodiments of FIGS. 11 and 12 may be applied when the data management device 100 is a master owner of off-chain data. Here, the meaning of the master owner is an owner having the highest permission for the data, and may mean an original creator, an initial distributor, or a top-level administrator of the data. For example, in the case that the data management device 100 shares its off-chain data to the first blockchain node 200 and the second blockchain node 300 as the master owner, when discarding its own off-chain data, data distributed to other blockchain nodes 200 and 300 may also need to be batching discarded. The embodiments of FIGS. 11 and 12 allow batching discarding of off-chain data owned by other blockchain nodes 200 and 300 in this situation.

FIG. 11 illustrates a method of verifying time information of a discard event based on a peer time of a blockchain node, but batching discarding off-chain data for all blockchain nodes.

In FIG. 11, the portion that the data management device 100 checks off-chain data, of which validation period has expired, and generates a discard event therefor, and the validity of the time information of the discard event is verified through time consensus of blockchain nodes 100, 200, 300 is the same as described in FIG. 8. Therefore, additional descriptions thereof are omitted to avoid duplication of descriptions.

Then, when the validity of the time information is verified through time consensus, the chain code of the blockchain network 50 generates a block event indicating that the time information is valid. Then, the data management device 100 and the blockchain nodes 200 and 300 detect the block event on the on-chain, and receive validity verification results for the time information therefrom.

Then, the data management device 100 deletes off-chain data based on the validity verification result. When the time information is valid, since it is verified, the data management device 100 deletes the off-chain data corresponding to the discard target of the discard event from its off-chain storage 10.

Other blockchain nodes 200 and 300 also check whether the off-chain data corresponding to the discard target is stored in their off-chain storage 20 and 30, and if stored, they delete the corresponding off-chain data in the off-chain storage 20 and 30.

FIG. 12 illustrates a method of verifying the time information of a discard event based on the block event time of a blockchain node, but batching discarding off-chain data for all blockchain nodes.

In FIG. 12, the portion that the data management device 100 checks off-chain data, of which validity period has expired, and generates a discard event for that, and in response, time consensus is progressed based on the timestamp of the transactions generated by the blockchain nodes 100, 200, and 300 to verify the validity of the time information is the same as described in FIG. 10. Therefore, additional descriptions thereof are omitted to avoid duplication of descriptions.

Then, when the validity of the time information is verified through the time consensus, the chain code of the blockchain network 50 generates a block event indicating that the time information is valid. Then, the data management device 100 and the blockchain nodes 200 and 300 detect the block event on the on-chain, and receive validity verification results for the time information therefrom.

Then, the data management device 100 deletes off-chain data based on the validity verification result. When the time information is valid, since it is verified, the data management device 100 deletes off-chain data corresponding to the discard target of the discard event in its off-chain storage 10.

Other blockchain nodes 200 and 300 also check whether off-chain data corresponding to the discard target is stored in their off-chain storage 20 and 30, and if stored, delete the corresponding off-chain data in the off-chain storage 20, 30.

Figure 13:
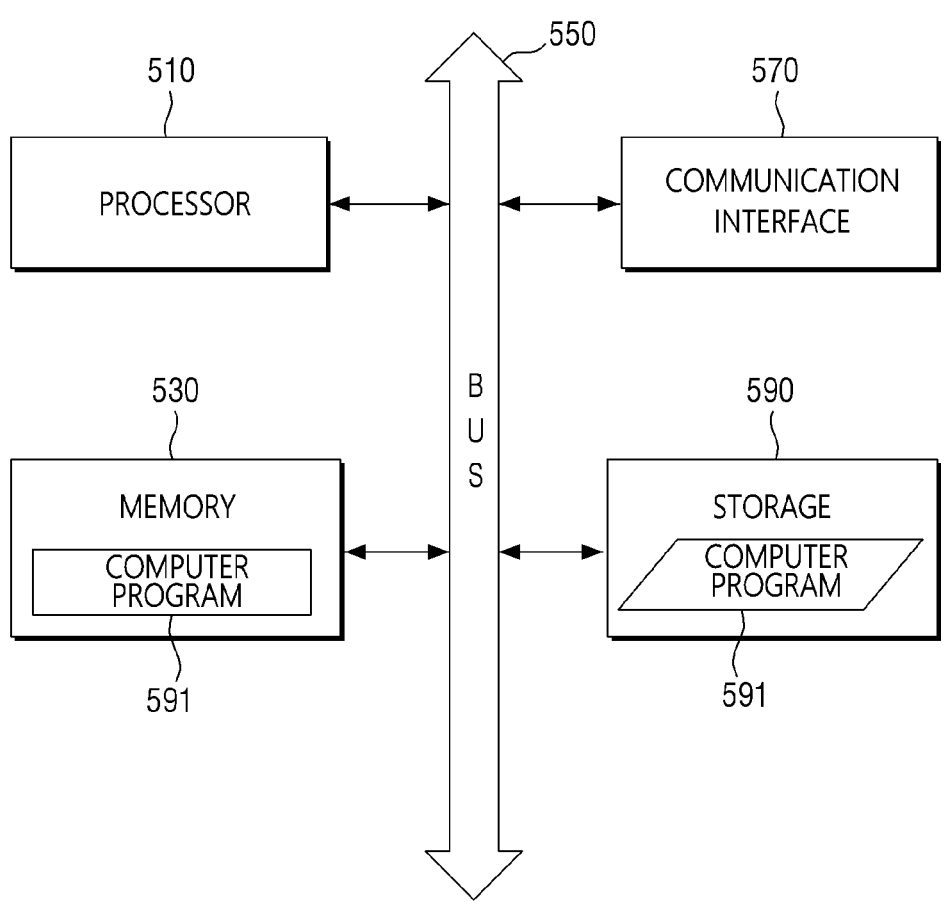
FIG. 13 is a block diagram illustrating an exemplary hardware configuration of a computing device 500, in which various embodiments of the present disclosure can be implemented.

FIG. 13 is an example hardware diagram illustrating a computing device 500. For example, a computing device 500 depicted in FIG. 17 may be a hardware device which implement the data management device 100 depicted in FIG. 1.

As shown in FIG. 17, the computing device 500 may include one or more processors 510, a bus 550, a communication interface 570, a memory 530, which loads a computer program 591 executed by the processors 510, and a storage 590 for storing the computer program 591. However, FIG. 17 illustrates only the components related to the embodiment of the present disclosure. Therefore, it will be appreciated by those skilled in the art that the present disclosure may further include other general purpose components in addition to the components shown in FIG. 17.

The processor 510 controls overall operations of each component of the computing device 500. The processor 510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 510 may perform calculations on at least one application or program for executing a method/operation according to various embodiments of the present disclosure. The computing device 500 may have one or more processors.

The memory 530 stores various data, instructions and/or information. The memory 530 may load one or more programs 591 from the storage 590 to execute methods/operations according to various embodiments of the present disclosure. An example of the memory 530 may be a RAM, but is not limited thereto.

The bus 550 provides communication between components of the computing device 500. The bus 550 may be implemented as various types of bus such as an address bus, a data bus and a control bus.

The communication interface 570 supports wired and wireless internet communication of the computing device 500. The communication interface 570 may support various communication methods other than internet communication. To this end, the communication interface 570 may be configured to comprise a communication module well known in the art of the present disclosure.

The storage 590 can non-temporarily store one or more computer programs 591. The storage 590 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 591 may include one or more instructions, on which the methods/operations according to various embodiments of the present disclosure are implemented. For example, the computer program 591 may include instructions for executing operations comprising recording a deletion event for off-chain data and time information of the deletion event in a blockchain network, and selectively deleting the off-chain data based on a validity verification result calculated for the time information, wherein the validity verification result is calculated using a time-consensus algorithm of the blockchain network. When the computer program 591 is loaded on the memory 530, the processor 510 may perform the methods/operations in accordance with various embodiments of the present disclosure by executing the one or more instructions.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although the operations are shown in a specific order in the drawings, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation. The scope of protection of the present invention should be interpreted by the following claims, and all technical ideas within the scope equivalent thereto should be construed as being included in the scope of the technical idea defined by the present disclosure.

What is claimed is:

1. A blockchain based data management method performed by a computing device, the method comprising:
    recording a deletion event for off-chain data and time information of the deletion event in a blockchain network; and
    selectively deleting the off-chain data based on a verification result for the time information obtained by a time-consensus algorithm of the blockchain network,
    wherein the time-consensus algorithm is an algorithm for verifying whether the time information is manipulated by aggregating verification values for the time information of each of a plurality of blockchain nodes participating in the blockchain network,
    wherein each of the verification values indicates validity of the time information based on whether the time information is located within a predetermined error range from each of reference time information, and whether the time information is located within a preset time window, and wherein the time information is determined to be invalid when the time information is located within the predetermined error range but out of the preset time window;

the time window is a time period determined by setting a margin period from a boundary time when a date changes; and the margin period is set to be greater than or equal to the predetermined error range.

2. The blockchain based data management method of claim 1, wherein the recording the time information in the blockchain network comprises:

checking a validity period of the off-chain data; and comparing the validity period with the time information, and recording the deletion event and the time information in the blockchain network if it is determined that the validity period has expired.

3. The blockchain based data management method of claim 1, wherein the verification values are determined based on the reference time information of each of the plurality of blockchain nodes.

4. The blockchain based data management method of claim 1, wherein the verification values are determined based on the reference time information of transactions generated by each of the plurality of blockchain nodes in response to the deletion event.

5. The blockchain based data management method of claim 1, wherein on-chain data related to the off-chain data is updated to indicate that the off-chain data has been deleted when it is determined that the time information is valid by the time-consensus algorithm; and the selective deletion of the off-chain data comprises deleting the off-chain data based on the updated on-chain data.

6. The blockchain based data management method of claim 1, wherein the selectively deleting of the off-chain data comprises:

deleting the off-chain data from an off-chain storage based on a block event indicating a validity verification result of the time information.

7. The blockchain based data management method of claim 6, wherein the selectively deleting the off-chain data further comprises:

generating an additional block event indicating that the off-chain data has been deleted, wherein on-chain data related to the off-chain data is updated to indicate that the off-chain data has been deleted, according to generation of the additional block event.

8. The blockchain based data management method of claim 6, wherein a first blockchain node is a node that receives and stores the off-chain data in a first off-chain storage; and the first blockchain node deletes the off-chain data from the first off-chain storage based on the block event.

9. A blockchain based data management method performed by a computing device, the method comprising:

transmitting a deletion request for off-chain data stored in a first off-chain storage to a first blockchain node;

checking, via a blockchain network, a deletion result according to the deletion request; and transmitting verification request for the deletion result to the first blockchain node, wherein the first blockchain node records storage space information comprising access information to the first off-chain storage in a ledger of the blockchain network in response to the verification request, wherein a chain code of the blockchain network verifies the deletion result by accessing the first off-chain storage using the storage space information and checking a storage area of the first off-chain storage, wherein on-chain data related to the first off-chain storage and recorded in the ledger comprises a plurality of data IDs and hash values corresponding to the data IDs;

each of the hash values indicates a hash value of storage area corresponding to each of the data IDs in the first off-chain storage; and the chain code randomly extracts a first data ID from the plurality of data IDs in the on-chain data and compares a first hash value corresponding to the first data ID with a second hash value calculated by accessing storage area corresponding to the first data ID to check authenticity of the first off-chain storage.

10. The blockchain based data management method of claim 9, further comprising:

providing a first encryption key of the computing device to the blockchain network, wherein the storage space information is encrypted with a second encryption key corresponding to the first encryption key and recorded in the ledger; and the chain code decrypts the storage space information using the first encryption key and verifies the deletion result using the decrypted storage space information.

11. The blockchain based data management method of claim 9, wherein the access information is one-time account information for the first off-chain storage.

12. A blockchain based data management apparatus comprising:

a processor;

a memory for loading a computer program executed by the processor; and a storage for storing the computer program, wherein the computer program comprises instructions for executing operations comprising:

recording a deletion event for off-chain data and time information of the deletion event in a blockchain network; and selectively deleting the off-chain data based on a verification result for the time information obtained by a time-consensus algorithm of the blockchain network, wherein the time-consensus algorithm is an algorithm for verifying whether the time information by aggregating verification values of each of a plurality of the blockchain nodes participating in the blockchain network, wherein each of the verification values indicates validity of the time information determined based on whether the time information is located within a predetermined error range from each of reference time information, and whether the time information is located within a preset time window, and wherein the time information is determined to be invalid when the time information is located within the predetermined error range but out of the preset time window;

the time window is a time period determined by setting a margin period from a boundary time when a date changes; and the margin period is set to be greater than or equal to the predetermined error range.

13. The blockchain based data management method of claim 11, wherein the chain code deletes the one-time account information after the verification of the deletion result is completed.

\* \* \* \* \*